(12) United States Patent
Koenig et al.

(10) Patent No.: US 6,898,992 B2
(45) Date of Patent: May 31, 2005

(54) METHOD FOR CONTROLLING THE ENGAGEMENT FORCE OF THE SYNCHRONIZERS OF A DUAL CLUTCH TRANSMISSION

(75) Inventors: Melissa Koenig, Howell, MI (US); Darren Firth, Parramatta (AU); Mark Buchanan, Rochester Hills, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 49 days.

(21) Appl. No.: 10/637,296

(22) Filed: Aug. 8, 2003

(65) Prior Publication Data

US 2005/0029068 A1 Feb. 10, 2005

(51) Int. Cl.⁷ ............................................. F16H 59/00
(52) U.S. Cl. ...................................................... 74/335
(58) Field of Search ............................. 74/335, 336 R; 701/60, 51

(56) References Cited

U.S. PATENT DOCUMENTS

| | | | |
|---|---|---|---|
| 3,589,483 A | 6/1971 | Smith ........................ 192/3.52 |
| 4,461,188 A | 7/1984 | Fisher ......................... 74/330 |
| 4,476,748 A * | 10/1984 | Morscheck ................. 477/122 |
| 4,513,631 A | 4/1985 | Koivunen .................... 74/360 |
| 4,544,057 A | 10/1985 | Webster et al. .......... 192/0.076 |
| 4,622,866 A * | 11/1986 | Ito et al. ..................... 477/122 |
| 4,827,784 A | 5/1989 | Muller et al. ................. 74/330 |
| 5,445,043 A * | 8/1995 | Eaton et al. .................. 74/335 |
| 5,662,198 A | 9/1997 | Kojima et al. ........... 192/87.11 |
| 5,711,409 A | 1/1998 | Murata ..................... 192/87.11 |
| 5,720,203 A | 2/1998 | Honda et al. ................. 74/325 |
| 5,890,392 A | 4/1999 | Ludanek et al. ............... 74/331 |
| 5,915,512 A | 6/1999 | Adamis et al. ............. 192/3.61 |
| 5,950,781 A | 9/1999 | Adamis et al. ............. 192/3.61 |
| 5,966,989 A | 10/1999 | Reed, Jr. et al. .............. 74/331 |
| 5,979,257 A | 11/1999 | Lawrie ........................ 74/335 |
| 6,006,620 A | 12/1999 | Lawrie et al. ................ 74/335 |
| 6,012,561 A | 1/2000 | Reed, Jr. et al. ........... 192/48.2 |
| 6,044,719 A | 4/2000 | Reed, Jr. et al. .............. 74/330 |
| 6,145,398 A | 11/2000 | Bansbach et al. ............. 74/335 |
| 6,164,149 A * | 12/2000 | Ohmori et al. ........... 74/336 R |
| 6,286,381 B1 | 9/2001 | Reed, Jr. et al. .............. 74/336 |
| 6,364,809 B1 | 4/2002 | Cherry ........................ 477/86 |

FOREIGN PATENT DOCUMENTS

GB     2 036 203 A    11/1980

* cited by examiner

*Primary Examiner*—Dirk Wright
(74) *Attorney, Agent, or Firm*—Bliss McGlynn, P.C.; Greg Dziegielewski (57) ABSTRACT

A method of controlling the engagement force of the synchronizers of a dual clutch transmission having a plurality of synchronizers to selectively engage and disengage various gear sets, and a plurality of shift actuators adapted to move the synchronizers. The method includes the steps of initiating a control routine to pressurize a shift actuator to move a synchronizer to a predetermined engagement position and determining the necessary level of force required to move the desired shift actuator to the predetermined engagement position such that the engagement movement is effected without excessive force. The method also includes the steps of determining the hydraulic pressure that corresponds to the determined level of force and varying the amount of available hydraulic line pressure delivered to the shift actuator such that the delivered pressure is the amount that corresponds to the determined level of force.

12 Claims, 4 Drawing Sheets

METHOD FOR CONTROLLING THE ENGAGEMENT FORCE OF THE SYNCHRONIZERS OF A DUAL CLUTCH TRANSMISSION

BACKGROUND OF THE INVENTION

1. Field of the Invention

The present invention relates, generally to the control of a dual clutch transmission and, more specifically, to a method for actively controlling the engagement force of the synchronizers of a dual clutch transmission for use in a motor vehicle driveline.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first, and oldest type is the manually operated transmission. These transmissions include a foot operated start-up or launch clutch that engages and disengages the driveline with the power plant and a gearshift lever to selectively change the gear ratios within the transmission. When driving a vehicle having a manual transmission, the driver must coordinate the operation of the clutch pedal, the gearshift lever and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. One disadvantage of the manual transmission is that there is an interruption in the drive connection during gear shifting. This results in losses in efficiency. In addition, there is a great deal of physical interaction required on the part of the operator to shift gears in a vehicle that employs a manual transmission.

The second, and newer choice for the transmission of power in a conventional motor vehicle is an automatic transmission. Automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween. In addition, automatic transmissions are typically more mechanically complex and therefore more expensive than manual transmissions.

For example, torque converters typically include impeller assemblies that are operatively connected for rotation with the torque input from an internal combustion engine, a turbine assembly that is fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter. However, when there is no torque multiplication, the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. Most recently, "automated" variants of conventional manual transmissions have been developed which shift automatically without any input from the vehicle operator. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. The design variants have included either electrically or hydraulically powered actuators to affect the gear changes. However, even with the inherent improvements of these newer automated transmissions, they still have the disadvantage of a power interruption in the drive connection between the input shaft and the output shaft during sequential gear shifting. Power interrupted shifting results in a harsh shift feel that is generally considered to be unacceptable when compared to smooth shift feel associated with most conventional automatic transmissions.

To overcome this problem, other automated manual type transmissions have been developed that can be power-shifted to permit gearshifts to be made under load. Examples of such power-shifted automated manual transmissions are shown in U.S. Pat. No. 5,711,409 issued on Jan. 27, 1998 to Murata for a Twin-Clutch Type Transmission, and U.S. Pat. No. 5,966,989 issued on Apr. 4, 2000 to Reed, Jr. et al for an Electro-mechanical Automatic Transmission having Dual Input Shafts. These particular types of automated manual transmissions have two clutches and are generally referred to simply as dual, or twin, clutch transmissions. The dual clutch structure is most often coaxially and cooperatively configured so as to derive power input from a single engine flywheel arrangement. However, some designs have a dual clutch assembly that is coaxial but with the clutches located on opposite sides of the transmissions body and having different input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

The dual clutch transmission structure may include two dry disc clutches each with their own clutch actuator to control the engagement and disengagement of the two-clutch discs independently. While the clutch actuators may be of the electromechanical type, since a lubrication system within the transmission requires a pump, some dual clutch transmissions utilize hydraulic shifting and clutch control. These pumps are most often gerotor types, and are much smaller than those used in conventional automatic transmissions because they typically do not have to supply a torque converter. Thus, any parasitic losses are kept small. Shifts are accomplished by engaging the desired gear prior to a shift event and subsequently engaging the corresponding clutch. With two clutches and two inputs shafts, at certain times, the dual clutch transmission maybe in two different gear ratios at once, but only one clutch will be engaged and transmitting power at any given moment. To shift to the next higher gear, first the desired gears on the input shaft of the non-driven clutch assembly are engaged, then the driven clutch is released and the non-driven clutch is engaged.

This requires that the dual clutch transmission be configured to have the forward gear ratios alternatingly arranged on their respective input shafts. In other words, to perform up-shifts from first to second gear, the first and second gears must be on different input shafts. Therefore, the odd gears will be associated with one input shaft and the even gears will be associated with the other input shaft. In view of this convention, the input shafts are generally referred to as the odd and even shafts. Typically, the input shafts transfer the applied torque to a single counter shaft, which includes mating gears to the input shaft gears. The mating gears of the counter shaft are in constant mesh with the gears on the input shafts. The counter shaft also includes an output gear that is meshingly engaged to a gear on the output shaft. Thus, the input torque from the engine is transferred from one of the clutches to an input shaft, through a gear set to the counter shaft and from the counter shaft to the output shaft.

Gear engagement in a dual clutch transmission is similar to that in a conventional manual transmission. One of the gears in each of the gear sets is disposed on its respective shaft in such a manner so that it can freewheel about the shaft. A synchronizer is also disposed on the shaft next to the freewheeling gear so that the synchronizer can selectively engage the gear to the shaft. To automate the transmission, the mechanical selection of each of the gear sets is typically performed by some type of actuator that moves the synchronizers. A reverse gear set includes a gear on one of the input shafts, a gear on the counter shaft, and an intermediate gear mounted on a separate counter shaft meshingly disposed between the two so that reverse movement of the output shaft may be achieved.

While these power-shift dual clutch transmissions overcome several drawbacks associated with conventional transmissions and the newer automated manual transmissions, it has been found that controlling and regulating the automatically actuated dual clutch transmissions is a complicated matter and that the desired vehicle occupant comfort goals have not been achievable in the past. There are a large number of events to properly time and execute within the transmission for each shift to occur smoothly and efficiently. Conventional control schemes and methods have generally failed to provide this capability. Accordingly, there exists a need in the related art for better methods of controlling the operation of dual clutch transmissions.

One particular area of improvement that is needed is in the control of the engagement force of the synchronizers used to actuate the engagement of the particular gear sets within the transmission. Current control methods have the general capability to engage and disengage the synchronizers as needed. However, they lack the ability to accurately determine the necessary force required to engage the synchronizers given the particular operating parameters present at the time of engagement to achieve smooth and efficient transmission operation. The engagement force must be varied based on a number of factors, such as the present gear ratio, the current output speed of the transmission, temperature, and the engine throttle setting, for example. If the shift engagement force is not properly calculated and executed, considering the operating parameters at the time, the shift will either be hard causing poor drivability and component wear, or the shift will be ineffectual and fail to engage the gear set. Conventional dual clutch transmission control methods lack the ability to provide the proper shift engagement force.

Accordingly, there remains a need in the art for a method for operatively and actively controlling the engagement force of the electro-hydraulic synchronizers of a dual clutch transmission for use in motor vehicle driveline.

SUMMARY OF THE INVENTION

The disadvantages of the related art are overcome by the method of the present invention for controlling the engagement force of the synchronizers of a dual clutch transmission having a plurality of synchronizers to selectively engage and disengage various gear sets, and a plurality of shift actuators adapted to move the synchronizers. The method includes the steps of initiating a control routine to pressurize a shift actuator to move a synchronizer to a predetermined engagement position and determining the necessary level of force required to move the desired shift actuator to the predetermined engagement position such that the engagement movement is effected without excessive force. The method also includes the steps of determining the amount of hydraulic pressure that corresponds to the determined level of force and varying the amount of available hydraulic line pressure delivered to the shift actuator such that the delivered pressure is the amount that corresponds to the determined level of force. The method of the present invention determines the amount of force to apply to the shift actuators to move the synchronizer in response to various conditions and also how much continued force to apply as the synchronizer moves. The method of the present invention determines all the required force necessary to smoothly and efficiently move the synchronizer to its predetermined engagement position so that the engagement movement is effected without excessive force.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
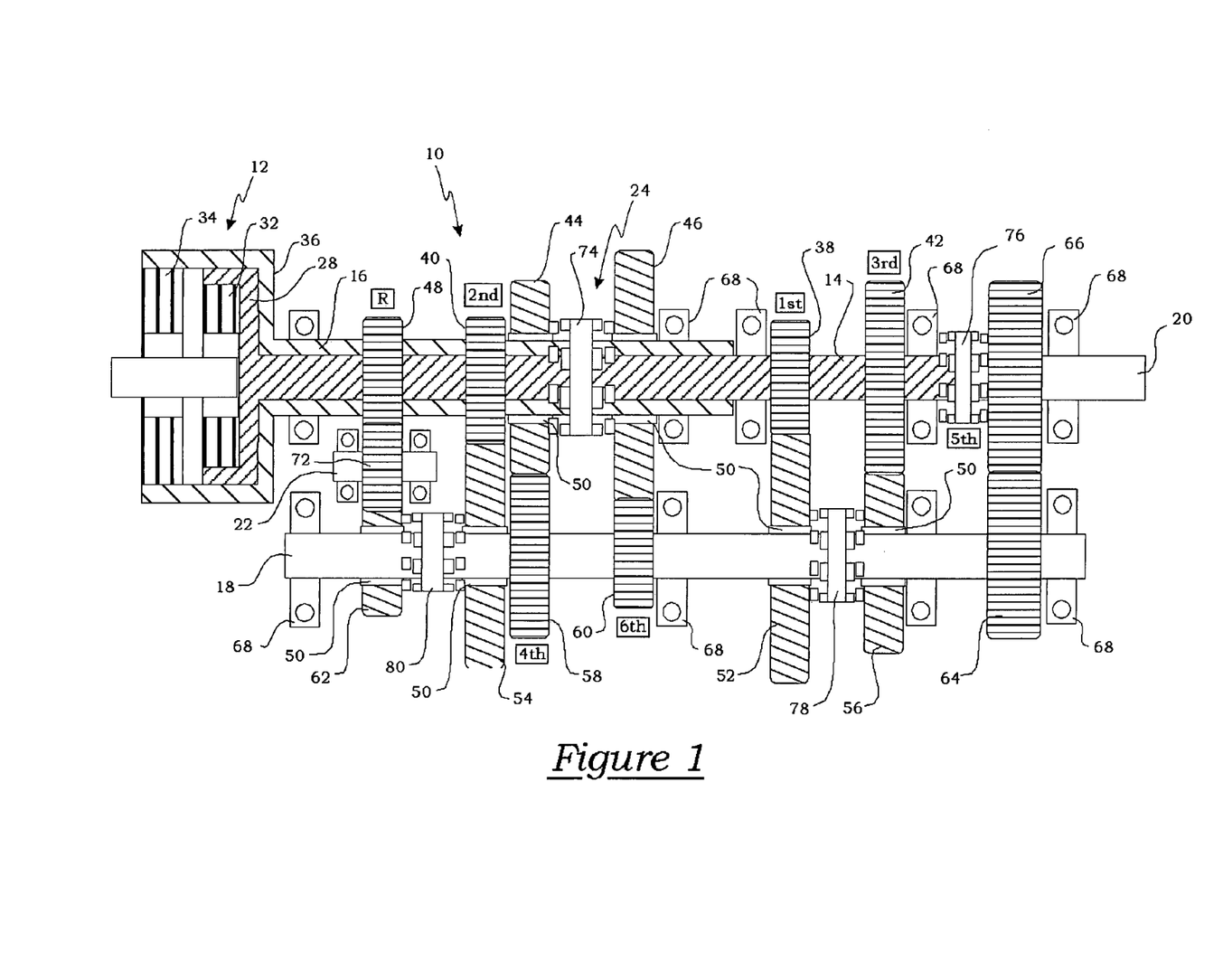
FIG. 1 is a generalized schematic illustration of a dual clutch transmission of the type that may be controlled by the method of the present invention.
Figure 2:
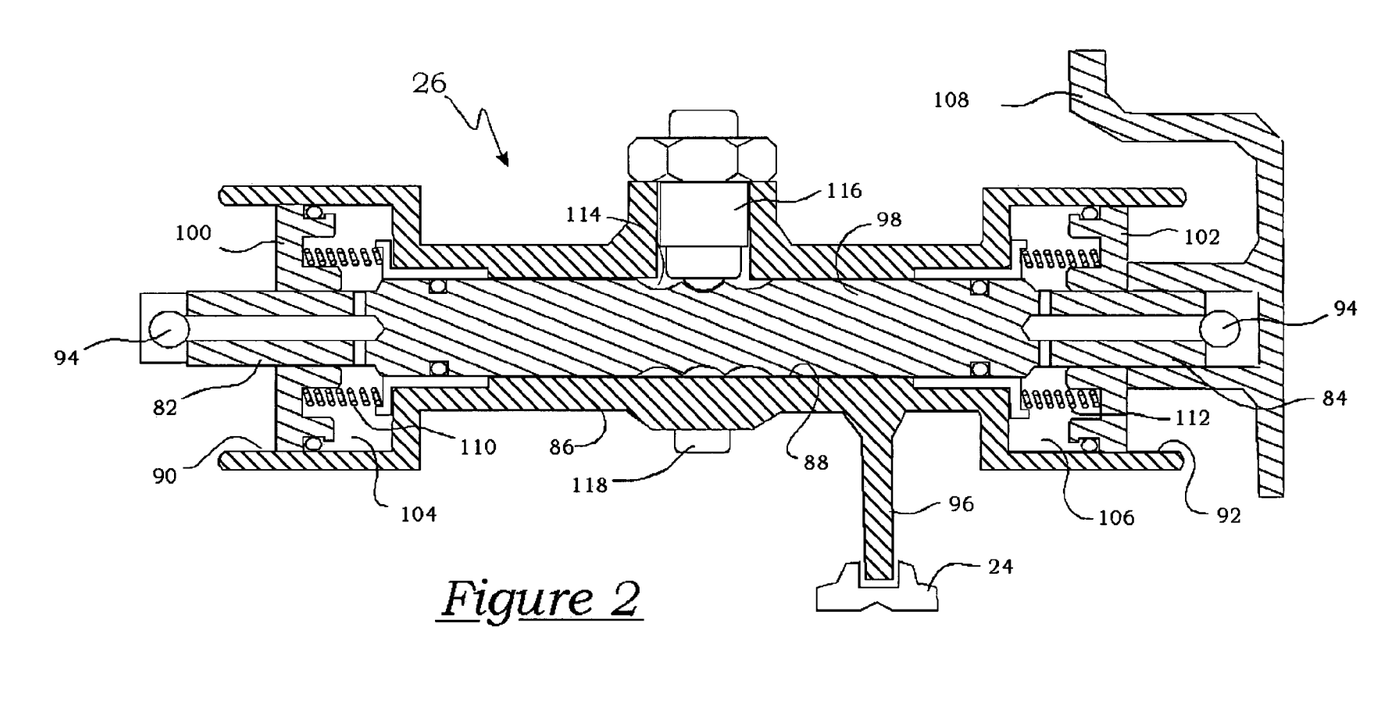
FIG. 2 is an cross-section side view of a hydraulically actuated shift actuator of a dual clutch transmission of the type that may be controlled by the method of the present.

A representative dual clutch transmission that may be controlled by the present invention is generally indicated at 10 in the schematic illustrated in FIG. 1. Specifically, as shown in FIG. 1, the dual clutch transmission 10 includes a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, a plurality of synchronizers, generally indicated at 24, and a plurality of shift actuators generally indicated at 26 (FIG. 2).

The dual clutch transmission 10 forms a portion of a vehicle powertrain and is responsible for taking a torque input from a prime mover, such as an internal combustion engine, and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacts with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators 26 to selectively engage one of the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1, the first and second clutch mechanisms 32, 34 are coaxial and co-centric such that the outer case 28 of the first clutch mechanism 32 fits inside of the outer case 36 of the second clutch mechanism 34. Similarly, the first and second input shafts 14, 16 are also coaxial and co-centric such that the second input shaft 16 is hollow having an inside diameter sufficient to allow the first input shaft 14 to pass through and be partially supported by the second input shaft 16. The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly supported on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

In the preferred embodiment, the counter shaft 18 is a single, one-piece shaft that includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and sixth counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly mounted on the output shaft 20. The output shaft 20 extends outward from the transmission 10 to provide an attachment for the remainder of the powertrain.

In the preferred embodiment, the reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gears 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 that are utilized to shift through the six forward gears and reverse. It should be appreciated that there are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its respective shaft when moved off of a center neutralized position to the right and engage another gear to its respective shaft when moved to the left. Specifically with reference to FIG. 1, synchronizer 78 can be actuated to the left to engage the first counter gear 52 on the counter shaft 18 or actuated to the right to engage the third counter gear 56. Synchronizer 80 can be actuated to the left to engage the reverse counter gear 62 or actuated to the right to engage the second counter gear 54. Likewise, synchronizer 74 can be actuated to the left to engage the fourth input gear 44 or actuated to the right to engage the sixth input gear 46. Synchronizer 76 is actuated to the right to directly engage the end of the first input shaft 14 to the output shaft 20 thereby providing a direct 1:1 (one to one) drive ratio for fifth gear. There is no gear set to engage to the left of synchronizer 76.

To actuate the synchronizers 74, 76, 78, and 80, this representative example of a dual clutch transmission 10 utilizes hydraulically driven shift actuators 26 with attached shift forks to selectively move the synchronizers so that they engage or disengage (neutralize) the desired gears. As shown in FIG. 2, the shift actuators 26 are essentially two way or dual hydraulic valve assemblies that are driven back and forth linearly, in parallel to one of the input shafts 14, 16 or the counter shaft 18, to move a shift fork 96, and ultimately one of the plurality of synchronizers 24 in and out of engagement. It should be appreciated from the description that follows that other types of actuators that are capable of driving a shift fork back and forth to move a synchronizer may also be employed with the method of the present invention. These include mechanical actuators, hydro-mechanical actuators, electromechanical actuators, electrical actuators, and the like.

Referring to FIG. 2, the hydraulically operated shift actuators 26 include an outer case 86 that includes a main bore 88 having two cylindrically shaped open ends 90, 92. A shift fork 96 is formed as part of the outer case 86 and extends radially outwards to engage a synchronizer that is disposed on one of the transmission shafts. A main shaft 98 is slidably disposed within the main bore 88 of the outer case 86. The main shaft 98 includes two opposing ends 82 and 84 upon which two piston 100, 102 are fixedly disposed, respectively. The pistons 100, 102 are moveable with respect to the cylindrically shaped open ends 90, 92 of the outer case 86. The interaction of each piston 100, 102 within its respective cylinder end 90, 92 forms an expansion chamber 104, 106. One of the ends 84 of the main shaft 98 is fixed to the body of the transmission 108. In this manner, the outer case 86 and shift fork 96 move relative to the fixed main shaft 98 so that the shift fork 96 will cause the synchronizer 24 to be moved. To affect movement of the outer case 86, the shifter fork 96, and thus the synchronizer 24, hydraulic fluid is selectively delivered under pressure to either one of the expansion chambers 104, 106 through the fluid passages 94.

When hydraulic pressure is applied to expansion chamber 104, the pressure acts against piston 100 and the cylinder shaped end 90 of the outer case 86 causing the outer case 86 and the shifter fork 96 to move to the right, as illustrated.

When hydraulic pressure is applied to expansion chamber 106, the pressure acts against piston 102 and the cylinder shaped end 92 of the outer case 86 causing the outer case 86 and the shifter fork 96 to move to the left. The expansion chambers 104, 106 also contain biasing members 110, 112 such as springs, which assist in returning the outer case 86 to its center, thereby urging the outer case 86 and the shifter fork 96 to its neutral position. It should be appreciated that when disengaging a synchronizer 24 from an engaged position, the hydraulic pressure that was applied to actuate the shift actuator 26 to the current engagement position is removed and the opposing expansion chamber may be charged with enough pressure and for sufficient time to move the shift actuator 26 back to a neutralized position rather than relying solely on the biasing force of the biasing member. The main shaft 98 also includes a set of circumferential grooves 114, which work cooperatively with a spring loaded ball assembly, generally indicated at 116, disposed upon the outer case 86 to provide detent positioning and serve as positive locating points for the movement of the shift actuator 26. The outer case 86 also includes an externally mounted position sensor 118 that is used to monitor the position of the outer case 86 relative to the fixed main shaft 98 so that the actual position of the synchronizer 24 is always known.

Figure 3:
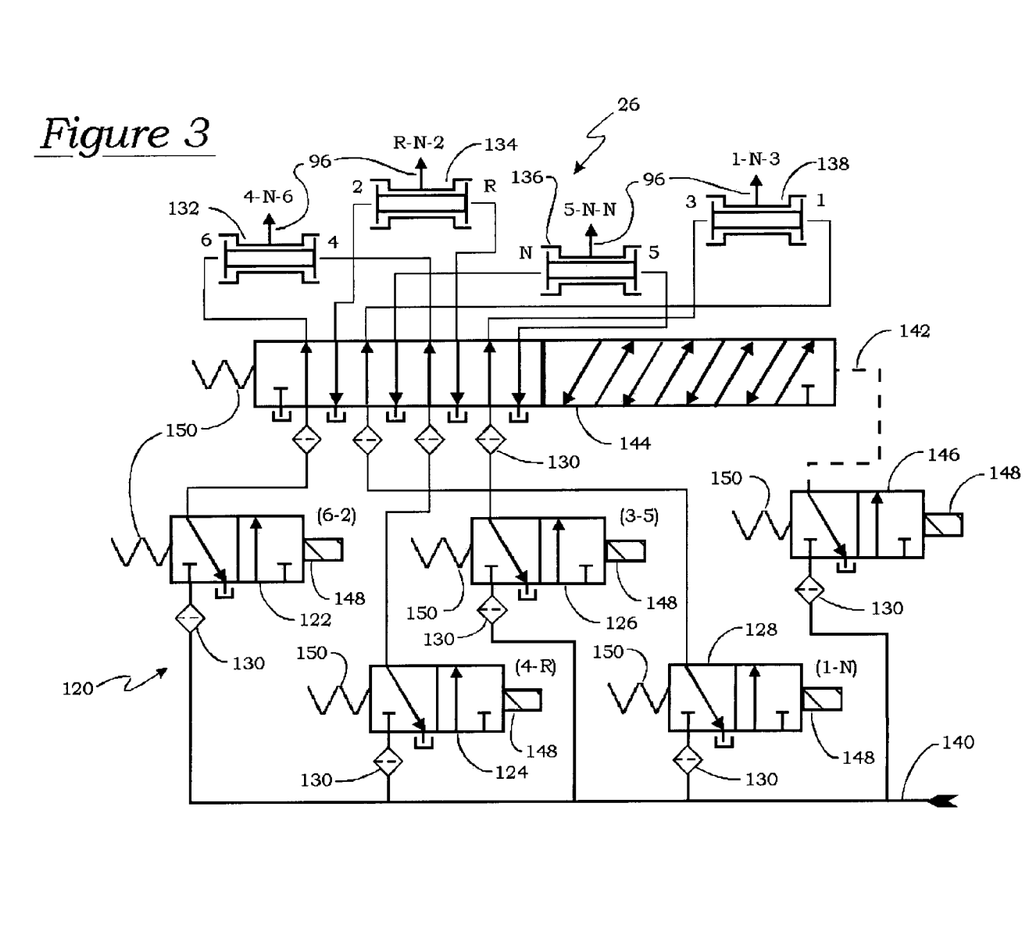
FIG. 3 is a schematic illustration of the electro-hydraulic control circuit for the shift actuators of a dual clutch transmission of the type that may be controlled by the method of the present invention.

The application of hydraulic pressure to the shift actuators 26 is operatively controlled by actuator solenoids, generally indicated at 120 in FIG. 3. The actuator solenoids 120 are electrically controlled by an electronic control unit (ECU), not shown but commonly known in the art. The steps of the method of the present invention direct the ECU to open and close the lines of pressurized hydraulic fluid that enter the expansion chambers 104 or 106 of the shift actuators 26. It should be appreciated that the method of the present invention, as schematically illustrated herein, is a control scheme stored, or otherwise located, within a greater control device such as an electronic control unit (ECU) overseeing the functioning of the transmission 10 or an electronic control unit for the vehicle in which the dual clutch transmission 10 may be installed. Regardless, there exists a control device that is used to control the transmission and that is generally beyond the scope of this invention but that is operable to provide the proper voltages, signals, and/or hydraulic pressures to operate the transmission 10 and particularly the actuator solenoids 120 of the dual clutch transmission 10. Thus, the control method of the present invention described below in connection with the flowchart is a portion, such as a sub-routine, or series of sub-routines, of a larger control scheme within the ECU. In this manner, the specific pressures or voltages required to generate the force to affect the movement of the shift actuators 26, the shift forks 96, and the synchronizers 24 of the dual clutch transmission 10 are controlled by the method of the present invention.

The actuator solenoids 120 and shift actuators 26 are schematically represented in FIG. 3. In this figure, all the actuator solenoids 120 are illustrated in the de-energized position. It should be appreciated that, as previously mentioned, the shift actuation of the dual clutch transmission 10 may be fully electrical rather than electro-hydraulic, and in that case, the actuator solenoids would be replaced by some type of physical drive devices to move the shift forks and the synchronizers. For clarity, the synchronizers 24 are not illustrated in FIG. 3 and the shift forks 96 are depicted as arrows extending from the shift actuators 26. As previously mentioned, each of the shift actuators 26 are dual hydraulic assemblies operatively moving a two sided synchronizer 24 to engage their respective gear sets. As shown in FIG. 3 with respect to this example of a dual clutch transmission 10, there is one actuator solenoid 122, 124, 126, and 128 for each of the shift actuators 132, 134, 136, and 138, respectively. Thus, each actuator solenoid 120 must provide pressure to both expansion chambers 104, 106 (left and right) for each shift actuator 26 to cause it to engage the synchronizers 24 in both directions. To this end, the actuator solenoids 120 are multiplexed (i.e., used for more than one operation) through the use of a multiplex valve 144. The multiplex valve 144 is controlled by a multiplex solenoid 146, which applies hydraulic pressure through line 142 to activate the multiplex valve 144 to the left, as illustrated. Through the multiplex valve 144, each actuator solenoid 120 provides the hydraulic pressure for two shift movements. The actuator solenoids 120 and the multiplex solenoid 146 are electrically controlled by the ECU through the application and interruption of a voltage to the coil assemblies 148 of the individual solenoids. The solenoids 120 and 146 have biasing members 150 that return the valve member to its normally closed position when de-energized, as shown in FIG. 3. It should be appreciated that the multiplex valve 144 and the multiplex solenoid 146 may also be a combined unit that would be electrically activated rather that an electro-hydraulic arrangement. It should be further appreciated that this particular multiplexing approach is only one of many possible actuating arrangements that may be constructed within a dual clutch transmission. It should be still further appreciated that the method steps of the present invention direct the ECU to control the actuation of the shift actuators 26 to provide a predetermined force to operate the synchronizers of a dual clutch transmission.

With continuing reference to FIG. 3 and to illustrate the operation of the actuator solenoids 120, when first gear is selected, actuator solenoid 128 is energized and the hydraulic fluid path to the right side of shift actuator 138 is pressurized causing shift actuator 138 to move to the left so that the shifter fork 96 moves synchronizer 78 into first gear engagement. It should be appreciated that line 140 in FIG. 3 is representative of a pressurized hydraulic supply line that provides hydraulic fluid to the actuators 26 through filters 130. When engaging second gear there is no direct path through the multiplex valve 144 and the multiplex solenoid 146 must be energized first so that the multiplex valve 144 opens a pathway for actuator solenoid 122 to pressurize the left side of shift actuator 134 which moves shift actuator 134 to the right so that the shifter fork 96 moves the synchronizer into second gear engagement. It should be further appreciated that the disengagement of the synchronizers 24 and thus the neutralization of an engaged gear set is accomplished by actuating the opposing side of the respective shift actuator 26. This opposing, neutralizing actuation of the shift actuator 26 is only to the point of moving the shift fork 96 and respective synchronizer to the neutral and disengaged position without continuing the actuation to a full engagement of the opposing gear set. Thus, to disengage first gear, actuator solenoid 126 is energized and the hydraulic fluid path to the left side of shift actuator 138 is pressurized causing shift actuator 138 to move to the right so that the shifter fork 96 moves synchronizer 78 out of first gear engagement to the neutral position.

Therefore, through the use of the multiplex valve 144, actuator solenoid 122 controls the shifts into either sixth or second gears, as well as the neutralization of fourth or reverse. Actuator solenoid 124 controls the shifts into either fourth or reverse gear, as well as the neutralization of second or sixth. Actuator solenoid 126 controls the shifts into either third or fifth gears, as well as the neutralization of first. Actuator solenoid 128 controls the shifts into first gear, as well as the neutralization of third or fifth. In this representative example, there are four solenoids and a multiplex valve allowing eight possible actuation combinations for this six-speed transmission with reverse. Only seven of the eight combinations are used. Thus, actuator solenoid 126 only has to neutralize one gear set. It should be appreciated that the action that moves a synchronizer into engagement is generally known as an "APPLY" action and the action to move a synchronizer out of engagement to a neutral position is generally known as a "RELEASE" action. Thus, in operation, each of the actuator solenoids 120 are used to charge one particular side of a shift actuator 26 for either an APPLY action or a RELEASE action depending upon the desired result. Once the necessity for either the APPLY or RELEASE action has been determined by a higher level portion of the ECU control scheme, the method of the present invention is utilized to determine the necessary force to apply to the actuator to affect that movement.

The method of the present invention will be described with reference to the flow chart generally indicated at 160 in FIG. 4. The method selectively controls the force applied to the shift actuators 26 of the each of the synchronizers 24 of the dual clutch transmission 10 so that the accurate engagement and smooth operation of each synchronizer 24 is achieved in the desired manner. For example, in operating the vehicle, a gear selection lever, or the like, may be placed in the "D" position by the operator to initiate forward motion. Through another program or sub-routine within the ECU, which is beyond the scope of this invention, the proper gear ratio within the dual clutch transmission for the current vehicle operating conditions is selected. In this example, from a vehicle standing start, a low gear, such as first gear, will likely be automatically selected. The ECU then makes a decision as to which, if any, actuators need to be engaged and which, if any, actuators need to be disengaged to accomplish the desired actions in the powertrain. These actions may include a commanded engagement of one or two gear ratio sets and a concurrently commanded disengagement and/or neutralization of one or two gear sets. It should be appreciated that the present invention is concerned with determining the required force to apply to the shift actuators to move the synchronizers of the dual clutch transmission only after higher level commands beyond the scope of this invention have been executed so as to determine which synchronizers are to be actuated and in what order for shifting purposes. It should be further appreciated that the force applied to the actuator to engage the synchronizer can differ between the various gears due to the differing inertia associated with each gear, the design of the synchronizer system, and the speed change that must occur during the particular synchronization event. Likewise, other factors such as transmission temperature, driver requests for instantaneous shifts (if allowed), and throttle position influence the application of actuator force. Finally, it should also be appreciated that these factors are used by the method of the present invention to control the synchronizer engagement force determination with the goal of the providing smooth and seamless shifts within the dual clutch transmission 10. In this way, harsh shifting is avoided and the driving feel of the vehicle is enhanced.

Figure 4:
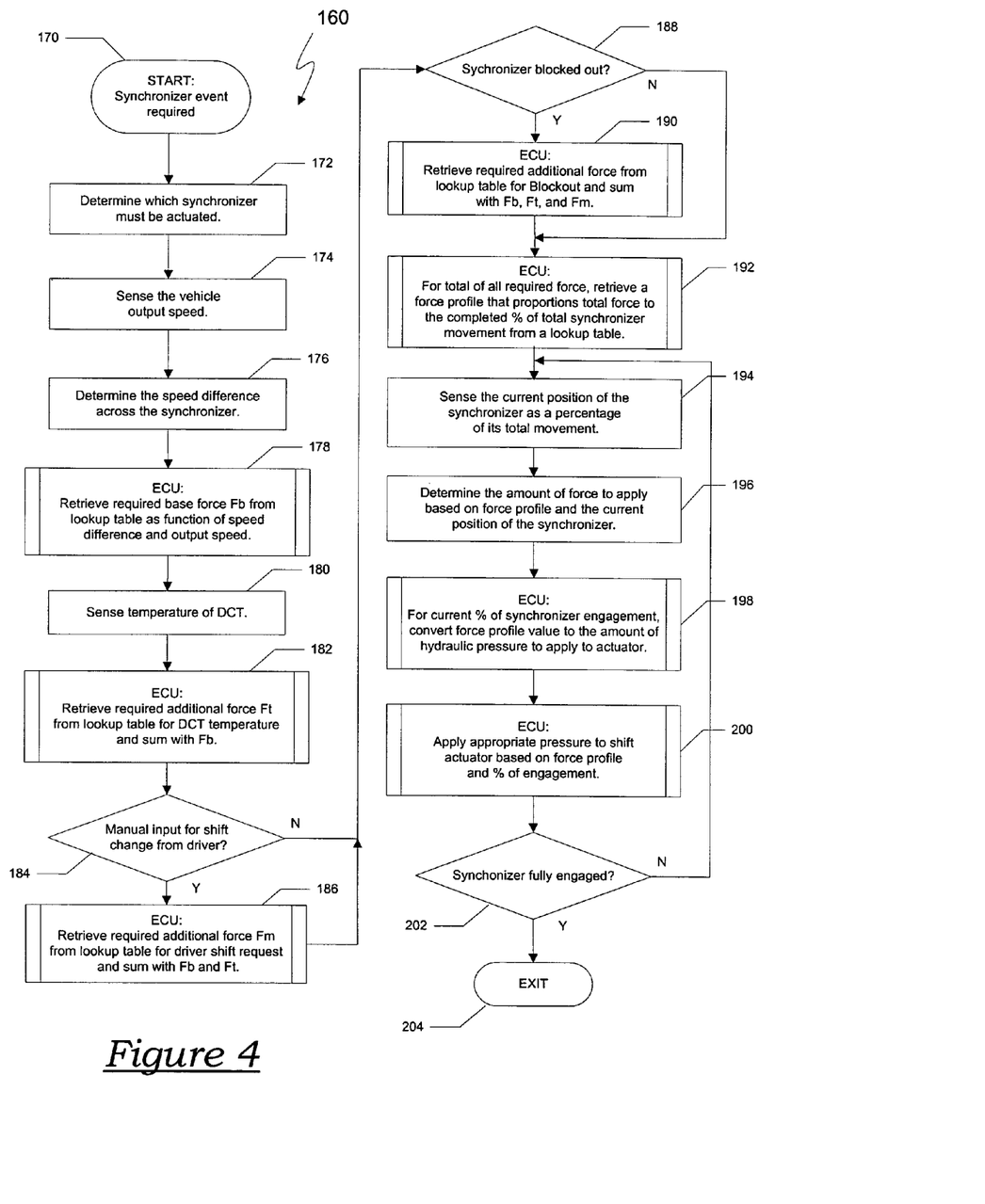
FIG. 4 is a block diagram flowchart of the method of the present invention for controlling a dual clutch transmission.

The control routine, and thus the method steps, of the present invention are initiated at the "START" entry block 170 of FIG. 4 when the ECU requires engagement of a synchronizer and must determine the amount of force to apply to the respective shift actuator 26. The succeeding method steps will then determine the amount of force to apply to the shift actuators 26 to move the synchronizer in response to various conditions and also how much continued force to apply as the synchronizer moves. To provide smooth and efficient synchronizer engagement, the method of the present invention determines all the required force necessary to move the synchronizer to its predetermined engagement position so that the engagement movement is effected without excessive force.

Once initiated, the flow path of the method steps moves to process block 172 to determine which particular synchronizer must be engaged and thus which particular shift actuator to charge. Once this determination is made, the path is followed to process block 174, which senses the output speed of the dual clutch transmission 10. It should be appreciated that this may be directly determined as the vehicle speed or may be a measured as the rotational speed of the output shaft of the transmission. The output speed is sensed first as a general indication of the torque within the transmission and on the output shaft. The force required to engage the synchronizer also influences the speed at which the synchronizer moves into engagement. Thus, at lower vehicle speeds there is less torque to overcome and the synchronizer engagement force must be reduced to avoid a quick change that will disturb the driveline. Secondly, the output speed at process block 174 is sensed to use in the determination of the next process block 176.

At process block 176 the speed of the synchronizer to be engaged is sensed then the difference between the speed of the synchronizer and the output speed (from block 174) is determined. This is the speed across the respective synchronizer. In other words, the synchronizer is about to engage a particular gear to the shaft on which it resides. Thus, process block 174 determines the difference between the rotational speed of the gear to be engaged and the rotational speed of the shaft. The greater the difference in speed, the more force that must be imparted to the synchronizer to engage the gear to its shaft.

Process block 178 then calls on the ECU to refer to a lookup table and retrieve a base force value $F_{base}$ as a function of the output speed sensed in block 174 and the speed across the synchronizer determined in block 176. It should be appreciated that this operation may be a repetitive mathematical calculation rather than a reference to a stored table of values. Regardless, the calculation used to either repetitively produce the base force value or to determine the values stored in the lookup table provides a base force value $F_{base}$ that will engage the synchronizer smoothly and efficiently if no other influencing factors are present. In that regard, the method steps proceed to process block 180, which senses the temperature of the transmission 10. The lower the temperature of the lubricating and cooling fluid in the transmission, the more viscous it becomes. The increase in viscosity of the transmission fluid increases the drag on the internal components, thereby requiring greater engagement force. To account for the viscosity due to the temperature, process block 182 calls on the ECU to refer to a lookup table and retrieve an additional force value as a function of the transmission temperature sensed in block 180 $F_{temp}$ and sum that value with the base force $F_{base}$ (block 178).

The method steps continue to decision block 184, in which the ECU determines if a manual input for a shift change has been commanded by the driver. It should be appreciated that this is a particular control feature that is employed on some vehicles having a dual clutch transmission 10 where it is desirable to offer the driver some manual control over the automatic shifting functions of the transmission. For example, it may be desired to allow the driver the ability to place the transmission in a manual control mode. This allows the driver to manually shift more aggressively in a demanding or performance oriented situation that the automatic function of the transmission would normally provide. In this case, the desire is to immediately shift and harshness introduced in the driveline will be disregarded. Most often, this requires additional synchronizer engagement force to immediately overcome inertial forces in the transmission. Therefore, if a manual input for a shift change has been commanded by the driver, the "Yes" path is followed to process block 186 and the ECU is called upon to refer to a lookup table and retrieve an additional force value $F_{man}$ as a function of the additional force necessary to complete an immediate synchronizer engagement and sum that value with the base force $F_{base}$ (block 178) and the additional force value for the transmission temperature $F_{temp}$ (block 180).

Once that summation has occurred or if there has not been a driver commanded shift request and the "No" path from decision block 184 is followed, the process continues with the method step at decision block 188. Decision block 188 checks to see if a condition is set to "blockout" the synchronizer from engaging. A blockout condition may occur due to various mechanical reasons that are typically determined in other control sub-routines or programs beyond the scope of this invention. If a blockout has occurred, the shift actuator 26 has already attempted to engage, was blocked out, returned to its neutral position and is in the process of reattempting to engage the synchronizer 24. That being the case, the "Yes" leg of decision block 188 will be taken to process block 190, which calls on the ECU to refer to a lookup table and retrieve a predetermined additional force value $F_{block}$ necessary to overcome a blockout condition and sum this value to the base $F_{base}$, temperature $F_{temp}$, and manual input $F_{man}$ values. This additional blockout added value is included in attempt to engage the synchronizer at the expense of a hard engagement event. It should be appreciated that in these instances, it is most likely that a mechanical problem has occurred that will require maintenance. Therefore, to avoid losing the ability to shift to the particular gear in question and immediately degrade transmission operation, a harder engagement is commanded (by adding the blockout force value) in an attempt to engage the synchronizer.

Once that summation has occurred or if there has not been a blockout condition and the "No" path from decision block 188 is followed, the process continues with the method step at process block 192. Process block 192 calls on the ECU to take the total value of all the summed force values and refer to a lookup table and retrieve a force profile from a lookup table. The force profile is a proportioning of the total force value depending on the percentage of completed synchronizer position. More specifically, the total force is apportioned to the percentage of completed synchronizer travel from its neutral position to fully engaged. In this manner, it can be seen that the method of the present invention provides smooth synchronizer engagement by not applying the total required force initially and fully throughout the engagement range of the synchronizer. In other words, using the force profile, the actuator force is "ramped up" and "ramped down" across the range of travel to bring the synchronizer smoothly and efficiently into engagement.

Once the force profile has been determined for the total force value, process block 194 senses the current position of the synchronizer as a percentage of its total travel to full engagement. Then process block 196 determines the amount of force to apply using the profile and the current percentage of synchronizer travel. Process block 198 then calls on the ECU to convert the determined applicable force in the force profile for the given percentage of travel to a hydraulic pressure amount to apply to the actuator 26. Finally, process block 200 calls on the ECU to apply the appropriate hydraulic pressure to the particular actuator 26 based on the above determinations. It should be appreciated that the hydraulic pressure system used to pressurized the actuators 26 and the actuator solenoids 120 as discussed above and illustrated in FIG. 3, provides a source of pressure greater than maximum force needed in any given engagement event such that the pressure (i.e. the engagement force) is controlled by regulating it down to the desired amount. It should be further appreciated that the ECU may now control the pressure applied to the actuators or provide the proper control signals to a separate control device that is operable to provide the proper hydraulic pressures to operate the actuator solenoids and provide regulation of the hydraulic pressure to the force values determined in the method of the present invention. However, this control device is beyond the scope of this invention. Any one of a variety of known non-limiting methods may be used to control the source pressure to the determined force value such as pulse width modulation of the actuator solenoids, for example. Regardless, the process step 200 provides the appropriate pressure value to actuate the synchronizer the proper amount. It should be further appreciated that if the dual clutch transmission 10 of the present invention is controlled and actuated by electrical solenoids and controls instead of hydraulics, process steps 198 and 200 would convert the appropriate force valves to the appropriate electrical signals.

As process block 200 commands the application of the appropriate hydraulic pressure, the method steps continue to decision block 202 which checks to see if the synchronizer is fully engaged. If the synchronizer has just begun its actuation or if it is in the process of moving, then the "No" path is taken back to process block 194 and the new synchronizer position is sensed. Then the force profile is referenced in regard to the new synchronizer position, and the force value and appropriate pressure values are adjusted through repeating the steps of process blocks 194, 196, 198, and 200. Thus, a loop occurs through process blocks 194, 196, 198, 200 and 202 until the synchronizer becomes fully engaged. In this manner, the method of the present invention tracks the force profile determined in process block 192 and controls the force applied to the synchronizer accordingly. Once the synchronizer is fully engaged the "Yes" path is followed and the method of the present invention is completed and exited at block 204. It should be appreciated that as previously mentioned in the discussion of blockout conditions, the method may be immediately commanded to repeat starting at entry block 170 or the method may not be repeated until the next normally occurring synchronizer event.

Thus, the method of the present invention overcomes the drawbacks of the prior art by determining the amount of force to apply to the shift actuators to move the synchronizer in response to various conditions and also how much continued force to apply as the synchronizer moves. The method of the present invention determines all the required force necessary to move the synchronizer to its predetermined engagement position so that the engagement movement is effected without excessive force. Additionally, a force profile is determined which proportions the total force value depending on the percentage of completed synchronizer position. In this manner, the present invention provides smooth synchronizer engagement by not applying the total required force initially and fully throughout the engagement range of the synchronizer, but using the force profile, "ramps up" and "ramps down" the actuator force across the range of synchronizer travel.

The invention has been described in an illustrative manner. It is to be understood that the terminology which has been used is intended to be in the nature of words of description rather than of limitation. Many modifications and variations of the invention are possible in light of the above teachings. Therefore, within the scope of the claims, the invention may be practiced other than as specifically described.

We claim:

1. A method of controlling the engagement force of the synchronizers of a dual clutch transmission having a plurality of synchronizers to selectively engage and disengage various gear sets, and a plurality of shift actuators adapted to move the synchronizers, said method includes the steps of:
   determining the necessary level of force required to move the desired shift actuator to the predetermined engagement position such that the engagement movement is effected without excessive force;
   determining the amount of hydraulic pressure that corresponds to the determined level of force; and
   varying the hydraulic pressure delivered to the shift actuator such that the delivered pressure is the amount that corresponds to the determined level of force.

2. A method as set forth in claim 1 wherein the step of determining the necessary level of force required to move the synchronizers further includes the steps of:
   determining a force profile that proportions the necessary level of force to the percentage of total synchronizer movement;
   sensing the current position of the synchronizer as a percentage of its total movement;
   determining the amount of force to apply to the synchronizer based on the force profile for the current position of the synchronizer;
   determining the amount of hydraulic pressure that corresponds to the amount of force determined by applying the force profile;
   varying the hydraulic pressure delivered to the shift actuator such that the delivered pressure is the amount based on the application of the force profile;
   sensing the new position of the synchronizer; and
   repeating the previous five steps until the synchronizer is fully engaged.

3. A method as set forth in claim 1 wherein the step of determining the necessary level of force required to move the synchronizers further includes the steps of:
   determining the output speed of the transmission;
   determining the difference in speed between the gear to be engaged and the output speed; and
   determining a base force as a function of the output speed of the transmission and the difference in speed between the gear to be engaged and the output speed.

4. A method as set forth in claim 3 wherein the step of determining the necessary level of force required to move the synchronizers further includes the steps of
   sensing the temperature of the transmission;
   determining an additional force value required to move the synchronizer based on the temperature of the transmission; and
   summing the base force and the additional force required for the temperature.

5. A method as set forth in claim 4 wherein the step of determining the necessary level of force required to move the synchronizers further includes the steps of
   determining an additional force value required to move the synchronizer immediately when a manual input from the driver requesting an immediate shift has been commanded; and
   summing the base force, the additional force required for the temperature of the transmission, and the additional force necessary to cause an immediate shift.

6. A method as set forth in claim 5 wherein the step of determining the necessary level of force required to move the synchronizers further includes the steps of
- determining if a synchronizer blockout condition has occurred for the synchronizer being moved;
- determining a predetermined additional force value required to move the synchronizer to the engaged position when a block out condition exists; and
- summing the base force, the additional force required for the temperature of the transmission, and the predetermined additional force required when a blockout condition occurs.

7. A method of controlling the engagement force of the synchronizers of a dual clutch transmission having a plurality of synchronizers to selectively engage and disengage various gear sets, and a plurality of shift actuators adapted to move the synchronizers, said method includes the steps of:
- determining the necessary level of force required to move the desired shift actuator to the predetermined engagement position such that the engagement movement is effected without excessive force;
- determining a force profile that proportions the necessary level of force to the percentage of total synchronizer movement;
- sensing the current position of the synchronizer as a percentage of its total movement;
- determining the amount of force to apply to the synchronizer based on the force profile for the current position of the synchronizer;
- determining the amount of hydraulic pressure that corresponds to the amount of force determined by applying force profile;
- varying the hydraulic pressure delivered to the shift actuator such that the delivered pressure is the amount based on the application of the force profile;
- sensing the new position of the synchronizer; and
- repeating the previous five steps until the synchronizer is fully engaged.

8. A method as set forth in claim 7 wherein the step of determining the necessary level of force required to move the synchronizers further includes the steps of:
- determining the output speed of the transmission;
- determining the difference in speed between the gear to be engaged and the output speed; and
- determining a base force as a function of the output speed of the transmission and the difference in speed between the gear to be engaged and the output speed.

9. A method as set forth in claim 8 wherein the step of determining the necessary level of force required to move the synchronizers further includes the steps of
- sensing the temperature of the transmission;
- determining an additional force value required to move the synchronizer based on the temperature of the transmission; and
- summing the base force and the additional force required for the temperature.

10. A method as set forth in claim 9 wherein the step of determining the necessary level of force required to move the synchronizers further includes the steps of
- determining an additional force value required to move the synchronizer immediately when a manual input from the driver requesting an immediate shift has been commanded; and
- summing the base force, the additional force required for the temperature of the transmission, and the additional force necessary to cause an immediate shift.

11. A method as set forth in claim 10 wherein the step of determining the necessary level of force required to move the synchronizers further includes the steps of
- determining if a synchronizer blockout condition has occurred for the synchronizer being moved;
- determining a predetermined additional force value required to move the synchronizer to the engaged position when a block out condition exists; and
- summing the base force, the additional force required for the temperature of the transmission, and the predetermined additional force required when a blockout condition occurs.

12. A method of controlling the engagement force of the synchronizers of a dual clutch transmission having a plurality of synchronizers to selectively engage and disengage various gear sets, and a plurality of shift actuators adapted to move the synchronizers, said method includes the steps of:
- determining the output speed of the transmission;
- determining the difference in speed between the gear to be engaged and the output speed;
- determining a base force as a function of the output speed of the transmission and the difference in speed between the gear to be engaged and the output speed;
- sensing the temperature of the transmission;
- determining an additional force value required to move the synchronizer based on the temperature of the transmission;
- determining an additional force value required to move the synchronizer immediately when a manual input from the driver requesting an immediate shift has been commanded;
- determining if a synchronizer blockout condition has occurred for the synchronizer being moved;
- determining a predetermined additional force value required to move the synchronizer to the engaged position when a block out condition exists;
- summing the base force, the additional force required for the temperature of the transmission, the additional force value required to move the synchronizer immediately when a manual input from the driver requesting an immediate shift has been commanded, and the predetermined additional force required when a blockout condition occurs to yield the necessary level of force required to move the desired shift actuator to the predetermined engagement position such that the engagement movement is effected without excessive force;
- determining a force profile that proportions the necessary level of force to the percentage of total synchronizer movement;
- sensing the current position of the synchronizer as a percentage of its total movement;
- determining the amount of force to apply to the synchronizer based on the force profile for the current position of the synchronizer;
- determining the amount of hydraulic pressure that corresponds to the amount of force determined by applying force profile;
- varying the hydraulic pressure delivered to the shift actuator such that the delivered pressure is the amount based on the application of the force profile;
- sensing the new position of the synchronizer; and
- repeating the previous five steps until the synchronizer is fully engaged.

* * * * *